US010182227B2

(12) United States Patent
Li et al.

(10) Patent No.: US 10,182,227 B2
(45) Date of Patent: Jan. 15, 2019

(54) AUTOSTEREOSCOPIC THREE-DIMENSIONAL (3D) DISPLAY DEVICE

(71) Applicant: SUPERD TECHNOLOGY CO., LTD., Shenzhen (CN)

(72) Inventors: Xiaoming Li, Shenzhen (CN); Haiyu Fan, Shenzhen (CN); Lei Yang, Shenzhen (CN); Yang Liu, Shenzhen (CN)

(73) Assignee: SUPERD TECHNOLOGY CO., LTD., Shenzhen (CN)

( * ) Notice: Subject to any disclaimer, the term of this patent is extended or adjusted under 35 U.S.C. 154(b) by 386 days.

(21) Appl. No.: 14/982,570

(22) Filed: Dec. 29, 2015

(65) Prior Publication Data
US 2016/0191909 A1  Jun. 30, 2016

(30) Foreign Application Priority Data

Dec. 29, 2014 (CN) .......................... 2014 1 0848304

(51) Int. Cl.
*H04N 13/04* (2006.01)
*H04N 13/305* (2018.01)
(Continued)

(52) U.S. Cl.
CPC ......... *H04N 13/398* (2018.05); *H04N 13/305* (2018.05); *H04N 13/356* (2018.05); *H04N 13/359* (2018.05); *H04N 13/366* (2018.05)

(58) Field of Classification Search
CPC ........... H04N 13/0404; H04N 13/0452; H04N 13/0454; H04N 13/0468; H04N 13/0497
(Continued)

(56) References Cited

U.S. PATENT DOCUMENTS

6,449,090 B1 * 9/2002 Omar ................. G02B 27/2214
348/51
2007/0242068 A1 * 10/2007 Han .................... H04N 13/0409
345/427
(Continued)

*Primary Examiner* — Deirdre L Beasley
(74) *Attorney, Agent, or Firm* — Anova Law Group, PLLC (57) ABSTRACT

An autostereoscopic three-dimensional (3D) display device and a method for an autostereoscopic 3D display device is provided. The display device includes a tracking device configured to track a user in an autostereoscopic 3D viewing state, a display panel coupled with a light splitting device for 3D displaying, a display driving circuit for driving the light splitting device; a 3D image display controlling chip configured to store hardware parameters of the autostereoscopic 3D display device and to control the display driving circuit to switch on/off the light splitting device, an application module configured to receive a 3D displaying request from an application program for displaying a 3D image on the display device, a tracking module configured to obtain position information of the user by the tracking device, a scheduling module configured to read hardware parameters of the autostereoscopic 3D display device and to calculate 3D image arrangement data, and a 3D image arrangement module configured to receive the 3D image arrangement data and to arrange an image required for 3D displaying. Further, the scheduling module causes the 3D image display controlling chip to switch on the light splitting device for the display device to enter a 3D display mode and display the arranged 3D image on the display device.

20 Claims, 8 Drawing Sheets

(51) Int. Cl.
*H04N 13/356* (2018.01)
*H04N 13/359* (2018.01)
*H04N 13/366* (2018.01)
*H04N 13/398* (2018.01)

(58) Field of Classification Search
USPC .......................................................... 348/51
See application file for complete search history.

(56) References Cited

U.S. PATENT DOCUMENTS

| | | | |
|---|---|---|---|
| 2013/0315559 A1* | 11/2013 | Hoerentrup | H04N 13/0456 386/230 |
| 2013/0328784 A1* | 12/2013 | Lee | G09G 5/006 345/169 |
| 2014/0078194 A1* | 3/2014 | An | G09G 3/003 345/691 |
| 2014/0091991 A1* | 4/2014 | An | G09G 5/14 345/32 |
| 2014/0118511 A1* | 5/2014 | Hyde | H04N 13/0468 348/54 |
| 2015/0002767 A1* | 1/2015 | Eichenlaub | G02B 27/2214 349/15 |
| 2016/0065954 A1* | 3/2016 | Son | H04N 13/0404 348/51 |

* cited by examiner

AUTOSTEREOSCOPIC THREE-DIMENSIONAL (3D) DISPLAY DEVICE

CROSS-REFERENCES TO RELATED APPLICATIONS

This application claims priority of Chinese Application No. 201410848304.3, filed on Dec. 29, 2014, the entire contents of which are hereby incorporated by reference.

FIELD OF THE INVENTION

The present disclosure generally relates to the field of three-dimensional (3D) display technologies and, more particularly, relates to autostereoscopic 3D display devices.

BACKGROUND

As three-dimensional (3D) display technologies advance, watching 3D movies and images on smartphones or tablets has become one of the most popular entertainments. Through a subtle difference of an object observed by a user' right eye and left eye, the user perceives a depth of the object and thus recognizes a 3D image. Such a difference between the left eye and right eye is called a parallax. 3D display technologies utilize artificial approaches to generate a certain parallax for the user's left eye and right eye. That is, two images with a parallax are sent to the user's left eye and right eye, respectively. After receiving the two different images observed by the user's left eye and the right eye, the user's brain generates a 3D feeling of the object.

To achieve autostereoscopic 3D on a display device, from a hardware aspect, a light splitting device is introduced into a display panel of the display device, which splits light emitted from the display panel. Thus, two images with a parallax are sent to the user's left eye and right eye, respectively. The light splitting device usually includes lenticular lenses, gratings, parallax barriers and etc.

Currently, autostereoscopic 3D on the display device is usually realized through a tracking technology combined with a 3D image arrangement technology. In particular, the user's location is tracked by hardware image acquisitions or infrared sensing, and determined by software algorithms. Combining the user's location information and hardware parameters of the display device, images for 3D displaying are arranged and 3D images suitable for displaying on the display device are generated. The 3D images can be watched by the user when the light splitting device operates normally.

Particularly, calculating the tracking information, arranging the 3D images, and reading the hardware parameters are realized by software. How to efficiently coordinate different functions to enable a smooth autostereoscopic 3D display on the display device and, meanwhile provide a safer, simpler and more reliable system level support are going to be addressed in the present invention.

BRIEF SUMMARY OF THE DISCLOSURE

One aspect of the present disclosure includes an autostereoscopic three-dimensional (3D) display device. The display device includes a tracking device configured to track a user in an autostereoscopic 3D viewing state, a display panel coupled with a light splitting device for 3D displaying, a display driving circuit for driving the light splitting device; a 3D image display controlling chip configured to store hardware parameters of the autostereoscopic 3D image display device and to control the display driving circuit to switch on/off the light splitting device, an application module configured to receive a 3D displaying request from an application program for displaying a 3D image on the display device, a tracking module configured to obtain position information of the user by the tracking device, a scheduling module configured to read hardware parameters of the autostereoscopic 3D image display device and to calculate 3D image arrangement data, and a 3D image arrangement module configured to receive the 3D image arrangement data and to arrange an image required for 3D displaying. Further, the scheduling module causes the 3D image display controlling chip to switch on the light splitting device for the display device to enter a 3D display mode and display the arranged 3D image on the display device.

Another aspect of the present disclosure includes a method for an autostereoscopic three-dimensional (3D) display device containing a tracking device, a display panel coupled with a light splitting device, a display driving circuit, and an image controlling chip. The method includes receiving a request from an application program for 3D displaying, tracking position information of a user by the tracking device based on the request, obtaining hardware parameters of the autostereoscopic 3D image display device from the image controlling chip, switching on the light splitting device by the display driving circuit for the display device to enter a 3D display mode, determining 3D image arrangement data, arranging an image required for 3D displaying to a 3D image and displaying the 3D images on the display device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention.

Figure 6:
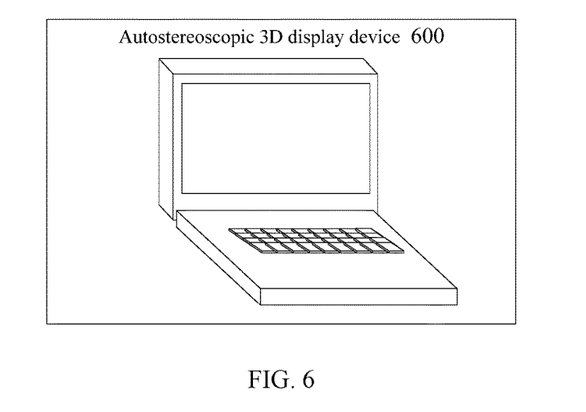
FIG. 6 illustrates an exemplary autostereoscopic three-dimensional (3D) display device consistent with disclosed embodiments.

FIG. 6 illustrates an exemplary autostereoscopic 3D image display device consistent with disclosed embodiments. The autostereoscopic 3D image display device is also called as a display device in the following description. As shown in FIG. 6, the autostereoscopic 3D image display device 600 may be a display device, such as a liquid crystal display (LCD), a tablet, a smart phone, a notebook, a personal computer with a monitor and etc. Although the display device 600 is shown as a notebook computer, any device with computing power may be used.

The display device 600 may consist a hardware layer and a software layer. The hardware layer may include various hardware, and the software layer may include various software, software modules and etc. Software is running on or implemented in hardware and, meanwhile driving hardware. The display device 600 may run a Windows, Android, IOS or other operation systems.

Figure 7:
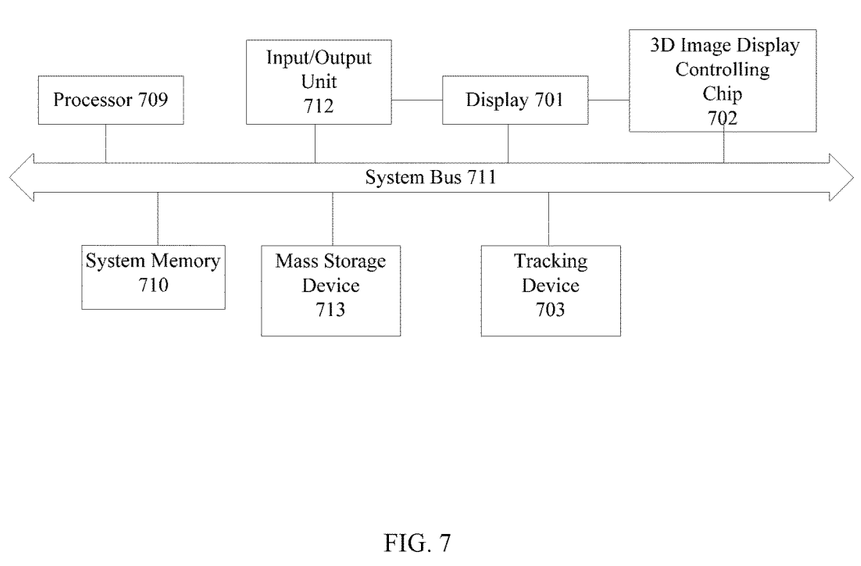
FIG. 7 illustrates a structural schematic of an exemplary autostereoscopic 3D image display device consistent with disclosed embodiments.

FIG. 7 illustrates a block diagram of an exemplary autostereoscopic 3D image display device consistent with disclosed embodiments. As shown in FIG. 7, the hardware components of the autostereoscopic 3D image display device may include a display 701, a 3D image display controlling chip 702, a tracking device 703, a processor 709, a system memory 710, a system bus 711, an input/output unit 712, and a mass storage device 713. Other components may be added and certain devices may be removed without departing from the principles of the disclosed embodiments.

The display 701 may be any appropriate type of display, such as plasma display panel (PDP) display, field emission display (FED), cathode ray tube (CRT) display, liquid crystal display (LCD), organic light emitting diode (OLED) display, light emitting diode (LED) display, or other types of displays. The 3D image display controlling chip 702 may usually be an independent chip, which may store hardware parameters of the display device.

The tracking device 703 may include different devices according to different tracking technologies. In certain embodiments, the tracking device 703 may include a camera capable of capturing images of the user's face. Software running on the processor 709 may analyze the captured face images and calculate the user's location. In certain other embodiments, the tracking device 703 may include an infrared (IR) receiver capable of detecting infrared light emitted by the user, and software running on the processor 709 may determine the user's location according to an infrared source. The tracking device 703 may also be switched on or off by software.

The processor 709 may include any appropriate type of central processing unit (CPU), graphic processing unit (GPU), general purpose microprocessor, digital signal processor (DSP) or microcontroller, and application specific integrated circuit (ASIC). The processor 709 may execute sequences of computer program instructions to perform various processes associated with the display device.

The system memory 710 is just a general term that may include read-only memory (ROM), random access memory (RAM) and etc. The ROM may store necessary software for a system, such as system software. The RAM may store real-time data, such as images for displaying.

The system bus 711 may provide communication connections, such that the display device may be accessed remotely and/or communicate with other systems via various communication protocols, such as transmission control protocol/internet protocol (TCP/IP), hypertext transfer protocol (HTTP), etc.

The input/output unit 712 may be provided for users to input information into the display device or for the users to receive information from the display device. For example, the input/output unit 712 may include any appropriate input device, such as a remote control, a keyboard, a mouse, an electronic tablet, voice communication devices, or any other optical or wireless input devices.

Further, the mass storage device 713 may include any appropriate type of mass storage medium, such as a CD-ROM, a hard disk, an optical storage, a DVD drive, or other type of storage devices.

During the operating process, the processor 709 and the 3D image display controlling chip 702 implementing various software modules, may perform certain processes to display 3D images to one or more users.

Figure 1:
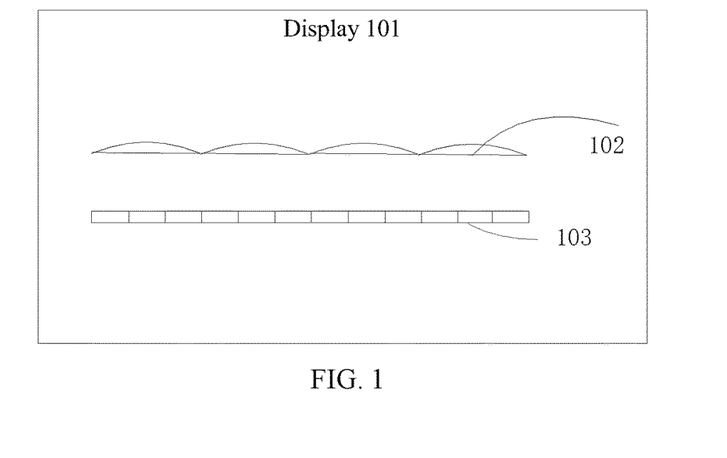
FIG. 1 illustrates a cross-sectional view of a display in an exemplary autostereoscopic 3D image display device consistent with disclosed embodiments.

FIG. 1 illustrates a cross-sectional view of a display in an exemplary autostereoscopic 3D image display device consistent with the disclosed embodiments. As shown in FIG. 1, the display 101 may include at least one display panel 103 and a light splitting device 102. The display panel 103 may include a plurality of display units, which may be individually controlled to display a certain grey level. That is, each display unit may be independently driven by a voltage to generate light with a certain intensity.

The light splitting device 102 may be attached to a surface of the display panel 103, and may also be disposed between a backlight module and the display panel 103. The light splitting device 102 may include a lenticular lens array, a slit grating, a slanted grating and etc., which may project light emitted from the display panel 103 to a user's left eye and right eye, respectively.

The light splitting device 102 may be switched on or off by software. When the light splitting device 102 is switched on, a 3D displaying function of the display device may be turned on and the display device may enter a 3D display mode. On the other hand, when the light splitting device 102 is switched off, the 3D displaying function of the display device may be also turned off and the display device may exit the 3D display mode, i.e., enter a 2D display mode.

As shown in FIG. 1 and FIG. 7, the 3D image display controlling chip 702 may store hardware parameters of the display device, such as pitch of the light splitting device 102, distance between the light splitting device 102 and the display panel 103, driving voltages and etc. The hardware parameters of the display device may play an important role in generating 3D images. The 3D image display controlling chip 702 may send out requests, and control a display driving circuit 102 to switch on or switch off the light splitting device 102. The display driving circuit 102 may also control the display panel 103.

Figure 2:
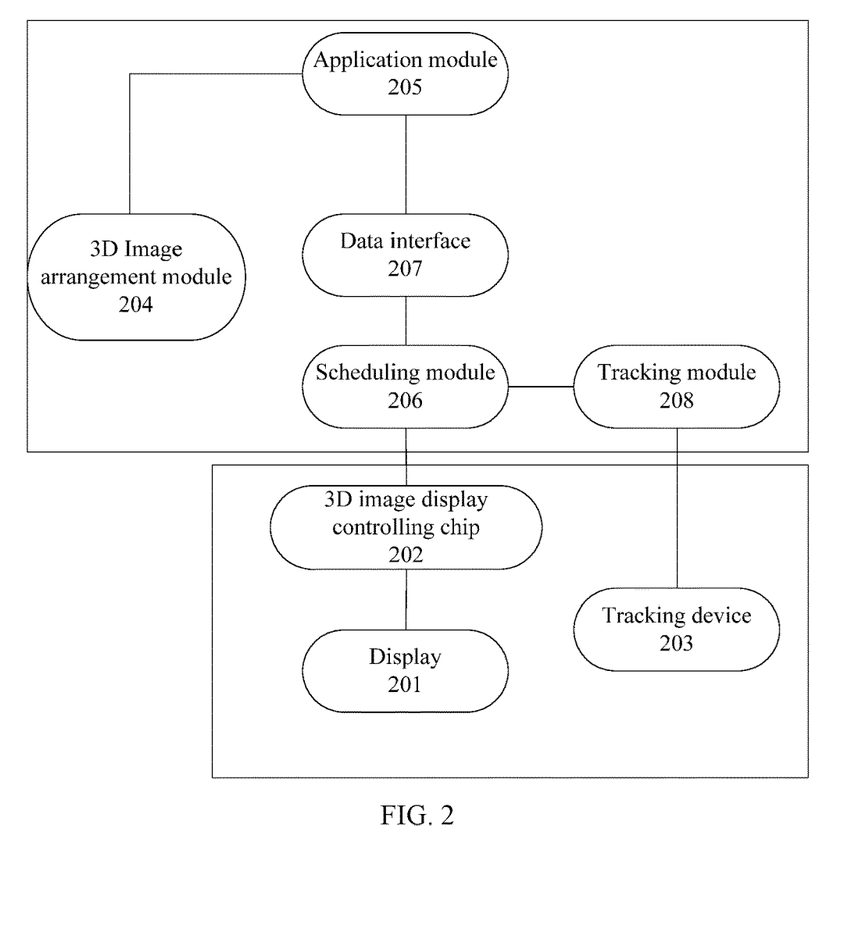
FIG. 2 illustrates a hardware/software structural schematic diagram of an exemplary autostereoscopic 3D image display device consistent with disclosed embodiments.

FIG. 2 illustrates a software/hardware structure schematic diagram of an exemplary autostereoscopic 3D image display device consistent with disclosed embodiments. As shown in FIG. 2, a hardware layer of the display device may include a display 201, a 3D image display controlling chip 202, and a tracking device 203. The hardware layer may further include a processor, a system memory, a system bus, an input/output unit, and a mass storage device, which are not shown here. The hardware layer may be implemented on the autostereoscopic 3D image display device shown in FIG. 6 and FIG. 7.

A software layer of the display device, according to functions, may be divided into a 3D image arrangement module 204, an application module 205, a scheduling module 206, a data interface 207, a tracking module 208 and etc. All of the modules may be software modules consisting executable requests. Software programs of the modules may be saved in the system memory, which may be called and executed by the processor to complete the corresponding functions.

It should be noted that, names of the modules are only for illustrative purposes. In the disclosed embodiments, the modules may be named according to the modules' basic functions. In other embodiments, the modules may also be named according to requirements, for example, the scheduling module 206 may also be named as a service module, and the application module 205 may also be named as an APP.

Further, the software modules may be divided into a client end and a server end. Because of acquiring data from other software modules, the application module 205 and the 3D image arrangement module 204 may be considered as the client end. The scheduling module 206 and the tracking module 208 may provide data to the client-side and thus may be considered as the server end. The data interface 207 may serve as a functional interface for transferring data between the client end and the server end and also perform other functions like protocol encapsulations, data format conversion and etc.

To improve a data conversion efficiency on different development platforms, the data may be directly transferred between the 3D image arrangement module 204 and the server end, such as in a Windows system. While in an Android system, the 3D image arrangement module 204 may only receive data transferred by the application module 205 and then arrange images required for 3D displaying based on the data received from the application module 205, thus a data transportation efficiency may be improved.

In the disclosed embodiments, the application module 205 may be triggered by a user and send a request to the scheduling module 206 though the date interface 207. Following the request, the scheduling module 206 may acquire the user's location information from the tracking module 208 as well as the hardware parameters of the display device from the 3D image display controlling chip 202. Then the scheduling module 206 may request the 3D image display controlling chip 202 to control a display driving circuit switch on a light splitting device, and the display device may enter a 3D display mode.

Based on the user's location information and the hardware parameters of the display device, the scheduling module 206 may calculate 3D image arrangement data and then send the 3D image arrangement data to the application module 205 through the data interface 207. Then the application module 205 may send the 3D image arrangement data to the 3D image arrangement module 204. Based on the 3D image arrangement data, the 3D image arrangement module 204 may arrange images required for 3D displaying and generate 3D images to be displayed on a display device.

Figure 8:
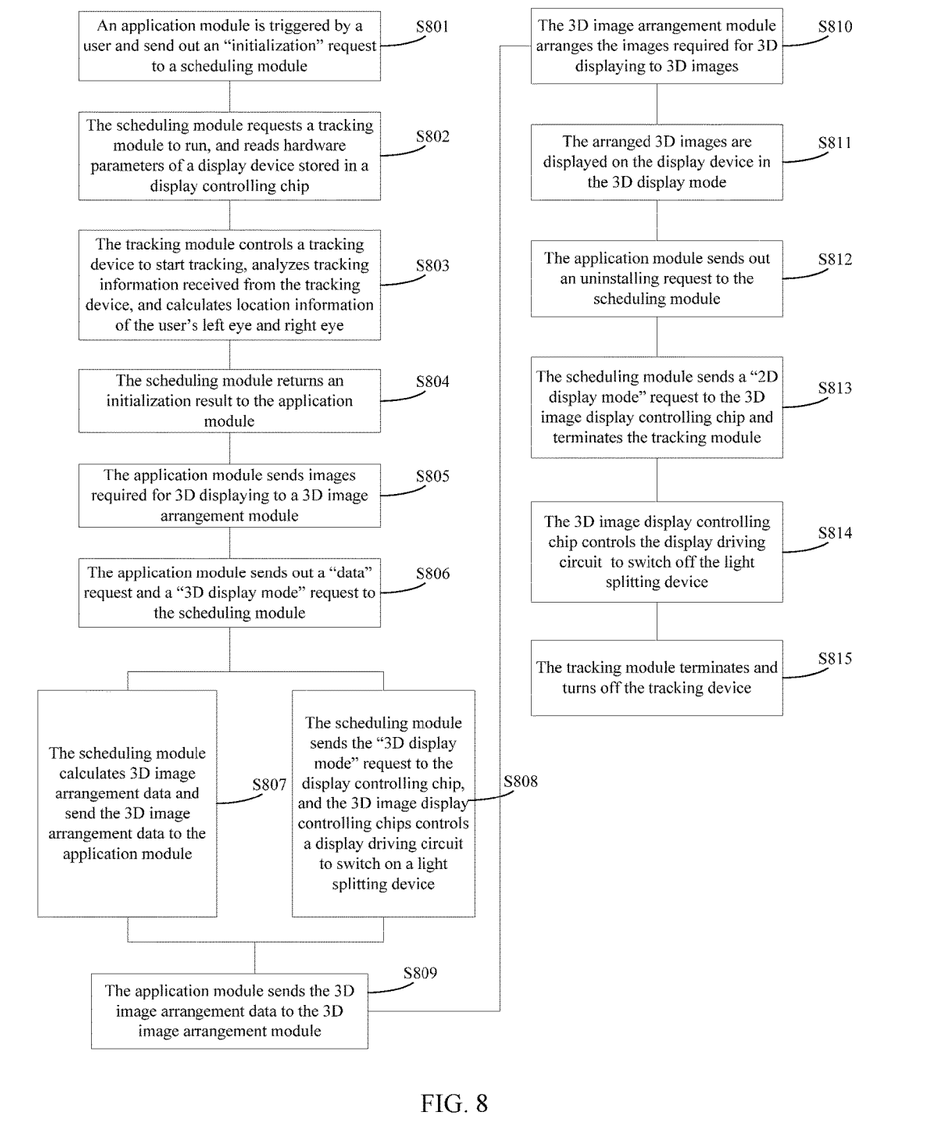
FIG. 8 illustrates a flow chart of an exemplary autostereoscopic 3D image display process consistent with disclosed embodiments.

FIG. 8 illustrates a flow chart of an exemplary autostereoscopic 3D image display process consistent with the disclosed embodiments. As shown in FIG. 8, the display process may include the following steps.

Step S801: an application module is triggered by a user and send out an "initialization" request to a scheduling module.

Step S802: after receiving the "initialization" request, the scheduling module requests a tracking module to run, and reads hardware parameters of a display device stored in a 3D image display controlling chip.

Step S803: the tracking module controls a tracking device to start tracking, analyzes tracking information received from the tracking device, and calculates location information of the user's left eye and right eye.

Step S804: the scheduling module returns an initialization result to the application module.

Step S805: the application module sends images required for 3D displaying to a 3D image arrangement module.

Step S806: the application module sends out a "data" request and a "3D display mode" request to the scheduling module.

Step S807: after receiving the "data" request, the scheduling module calculates 3D image arrangement data based on the hardware parameters of the display device and the location information of the user's left eye and right eye, and then send the 3D image arrangement data to the application module.

Step S808: after receiving the "3D display mode" request, the scheduling module sends the "3D display mode" request to the 3D image display controlling chip, the 3D image display controlling chip controls a display driving circuit to switch on a light splitting device, and a display device switches to a 3D display mode.

Step S809: the application module sends the 3D image arrangement data to the 3D image arrangement module.

Step S810: after receiving the 3D image arrangement data, the 3D image arrangement module arranges the images required for 3D displaying to 3D images.

Step S811: the arranged 3D images are displayed on the display device in the 3D display mode.

Step S812: the application module sends out an uninstalling request to the scheduling module.

Step S813: after receiving the uninstalling request, the scheduling module sends a "2D display mode" request to the 3D image display controlling chip and terminates the tracking module.

Step S814: after receiving the "2D display mode" request, the 3D image display controlling chip controls the display driving circuit to switch off the light splitting device, and the display device switches to a 2D display mode.

Step S815: the tracking module terminates and turns off the tracking device.

Figure 3:
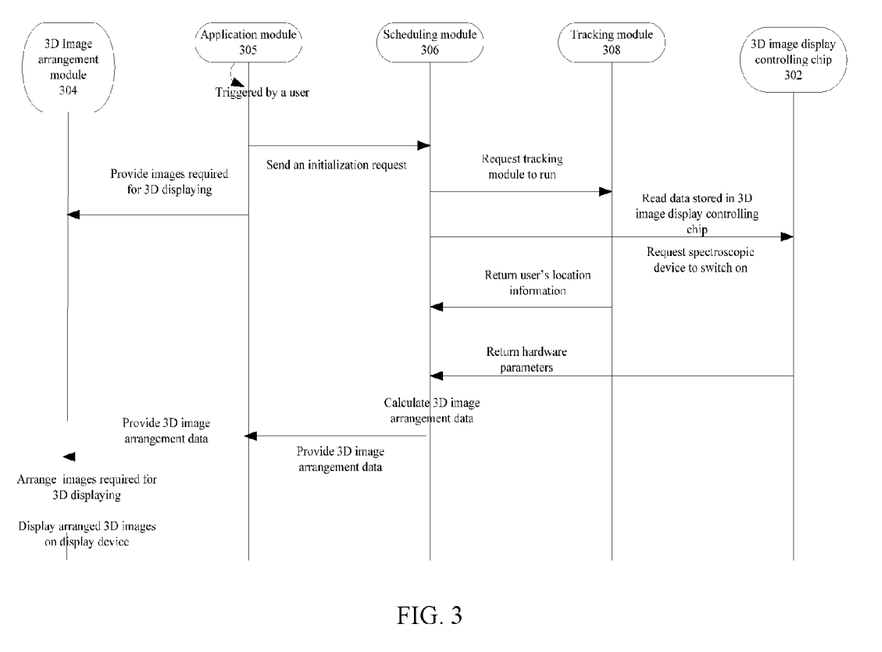
FIG. 3 illustrates an exemplary interaction sequence diagram in an exemplary autostereoscopic 3D image display device consistent with disclosed embodiments.

FIG. 3 illustrates an exemplary interaction sequence diagram for an exemplary autostereoscopic 3D image display device consistent with disclosed embodiments. As shown in FIG. 3, an application module 305 may be triggered by a user and send an initialization request to a scheduling module 306. After receiving the initialization request, the scheduling module 306 may control a tracking module 308 to start running. The tracking module 308 may control a tracking device to start tracking, such as turning on a camera or IR light to track the user.

Based on the tracking information obtained from the tracking device, the tracking module 308 may determine location information of the user's left eye and right eye, and send the location information to the scheduling module 306.

In particular, based on the tracking information obtained from the tracking device, the tracking module 308 may determine the user's coordinate, and further determine certain parameters such as a distance between the user's eyes and a display device and etc.

On the other hand, after receiving the initialization request, the scheduling module 306 may read hardware parameters of the display device from a 3D image display controlling chip 302, such as a pitch of a grating, a distance between the grating and the display panel and etc.

After receiving the hardware parameters of the display device, the scheduling module 306 may save the hardware parameters of the display device, calculate 3D image arrangement data based on the location information of the user's left eye and right eye as well as the hardware parameters of the display device, and then send the 3D image arrangement data to the application module 305 through a data interface 307. Meanwhile, the scheduling module 306 may request a 3D image display controlling chip 302 to control a display driving circuit to switch on a light splitting device. Thus the display device may enter the 3D display mode.

After receiving the 3D image arrangement data from the scheduling module 306, the application module 305 may directly send the 3D image arrangement data to a 3D image arrangement module 304. In the disclosed embodiments, the application module 305 may immediately send images required for 3D displaying to the 3D image arrangement module 304 after sending the initialization request to the scheduling module 306, thus the data transmission efficiency may be improved.

In other embodiments, the application module 305 may send the images required for 3D displaying to the 3D image arrangement module 304 after receiving the 3D image arrangement data from the scheduling module 306.

Figure 5:
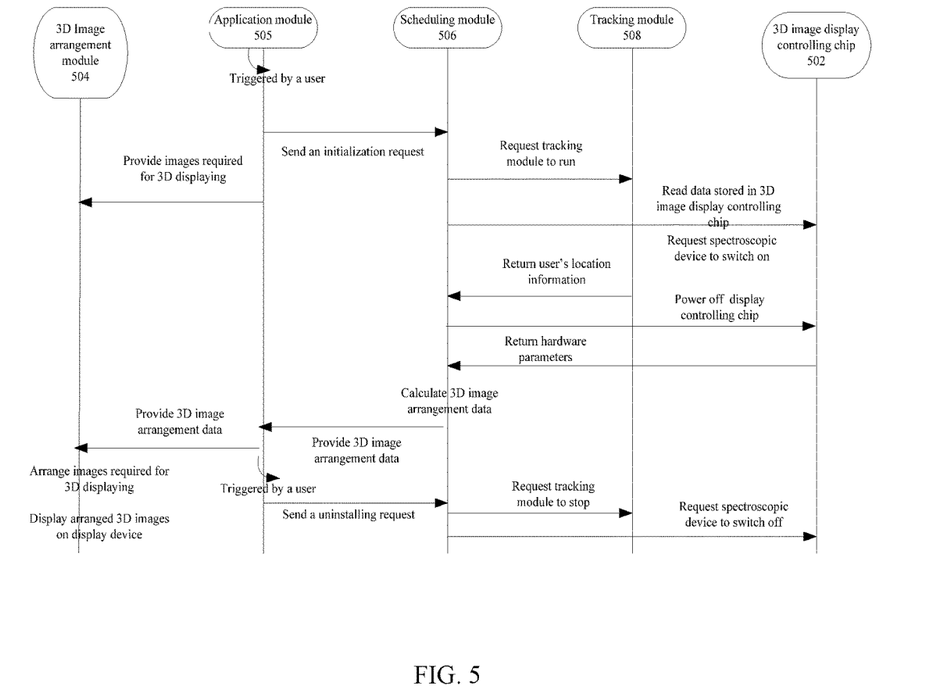
FIG. 5 illustrates another exemplary interaction sequence diagram in an exemplary autostereoscopic 3D image display device consistent with disclosed embodiments.

FIG. 5 illustrates another exemplary interaction sequence diagram for an exemplary autostereoscopic 3D image display device consistent with disclosed embodiments. As shown in FIG. 5, after being triggered by a user, an application module 505 may send an uninstalling request to a scheduling module 506. Then the scheduling module 506 may request a tracking module 508 to stop a tracking device and, meanwhile request a 3D image display controlling chip 502 to control a display driving circuit of a light splitting device to switch off the light splitting device. Thus the display device may exit the 3D display mode, i.e., enter the 2D display mode.

As shown in FIG. 3 and FIG. 5, through properly coordinating the scheduling module 306, the tracking module 308 and the 3D image arrangement module 304 in the software layer as well as cooperating with the tracking device, the display panel coupled with the light splitting device, the display driving circuit, the 3D image display controlling chip 302 and the light splitting device in the hardware layer, the display device may be smoothly switched between the 3D display mode and the 2D display mode, and the user's 3D viewing experience may get enhanced. On the other hand, the display device may timely and accurately terminate various software modules and hardware devices, enabling a normal operation of the display device.

Further, for autostereoscopic 3D developers, the above-mentioned system architecture may provide a simpler, safer and more reliable system level support, thus the developers may just input images required for arrangement (i.e. images required for 3D displaying) to realize the autostereoscopic 3D displaying, without considering specific implementations of the 3D image arrangement.

Figure 4:
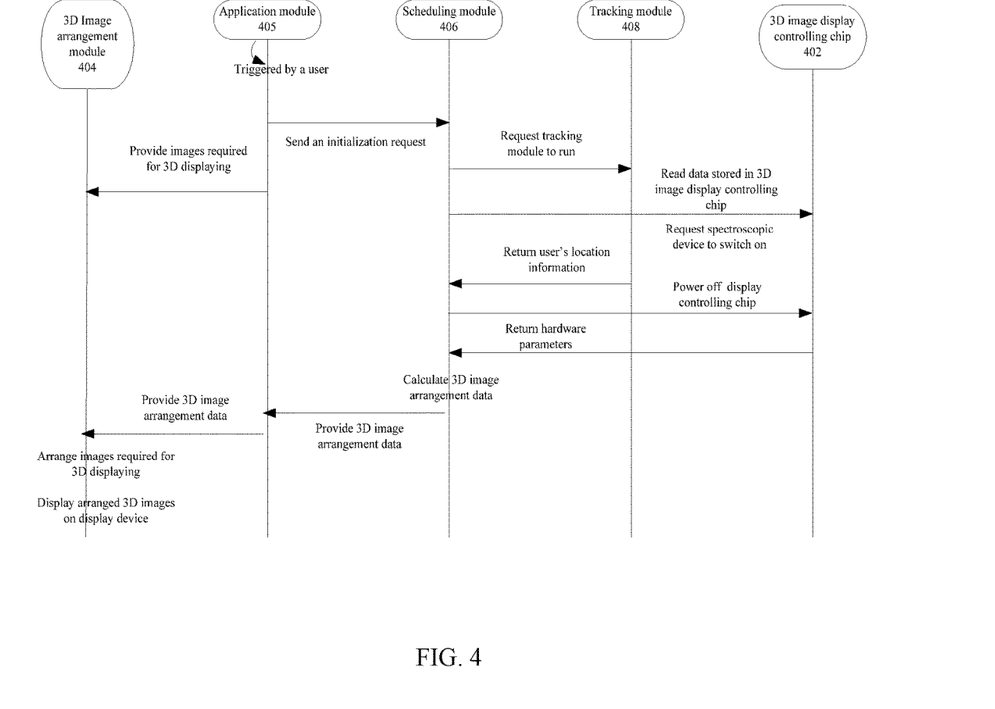
FIG. 4 illustrates another exemplary interaction sequence diagram in an exemplary autostereoscopic 3D image display device consistent with disclosed embodiments.

FIG. 4 illustrates another exemplary interaction sequence diagram for an exemplary autostereoscopic 3D image display device consistent with disclosed embodiments. As shown in FIG. 4, a scheduling module 406 may power on a 3D image display controlling chip 402 when reading hardware parameters of the display device from the 3D image display controlling chip 402. After finishing reading, the scheduling module 406 may save the hardware parameters of the display device and power off the 3D image display controlling chip 402.

In addition, the scheduling module 406 may power on the 3D image display controlling chip 402 to control a display driving circuit to switch on a light splitting device. After the display device enters the 3D display mode, the scheduling module 406 may power off the 3D image display controlling chip 402.

In a conventional autostereoscopic 3D image display device, the 3D image display controlling chip is usually powered on until the scheduling module sends out an uninstalling request. That is, the 3D image display controlling chip is usually powered on until the display device exits the 3D display mode. As shown in FIG. 4, the 3D image display controlling chip 402 may be prevented from keeping a power-on status during the whole 3D image display process, thus the 3D image display controlling chip 402's power consumption may be reduced.

Further, the present invention may provide an approach to compensate a defect of the display driving circuit based on liquid crystals, such as a liquid crystal grating and etc. Taking a liquid crystal grating as an example. The display driving circuit of the liquid crystal grating may power on or power off the liquid crystal grating for the display device to switch between the 3D display mode and the 2D display mode.

Due to a property limitation of liquid crystal molecules, the liquid crystal grating may have a switching time of approximately 4 s. That is, after being powered on, it may take the liquid crystal grating approximately 4 s to be switched on; after being powered off, it may take the liquid crystal grating approximately 4 s to be switched off. Thus, a display mode switching process between the 3D display mode and the 2D display mode may take approximately 4 s, which may be considered as a defect of the display driving circuit of the liquid crystal grating.

Figure 9:
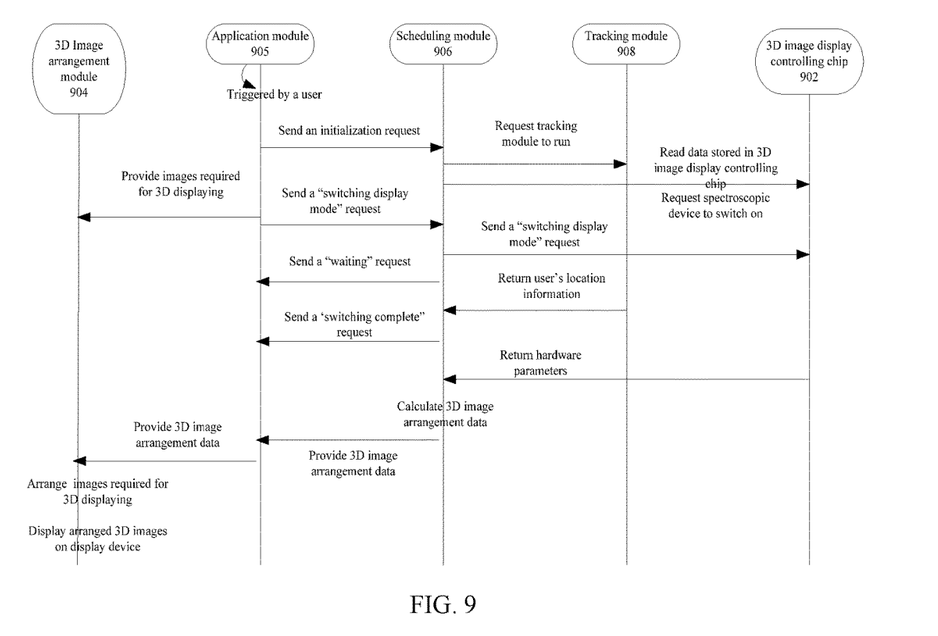
FIG. 9 illustrates another exemplary interaction sequence diagram in an exemplary autostereoscopic 3D image display device consistent with disclosed embodiments.

FIG. 9 illustrates another exemplary interaction sequence diagram in an exemplary autostereoscopic 3D image display device consistent with disclosed embodiments. As shown in FIG. 9, after receiving a "switching display mode" request from an application module 905, a scheduling module 906 may send the "switching display mode" request to a 3D image display controlling chip 902. The 3D image display controlling chip 902 may control the display driving circuit of the liquid crystal grating to switch the display device to the 3D (or 2D) display mode. During the display mode switching process (i.e. the switching time is approximately 4 s), the scheduling module 906 may keep sending a "waiting" request to the application module 905 until the display device finishes the display mode switching process. The display device may still display a 2D (or 3D) content when the application module 905 is receiving the "waiting" request.

After the display device finishes the display mode switching process, the scheduling module 906 may send a "switching complete" request to the application module 905. After the application module 905 receives the "switching complete" request, the display device may begin to display a 3D (or 2D) content. Although there may be a time delay between the "switching display mode" request and the content displayed on the display device, the content displayed on the display device may be consistent with the display mode of the display device.

Figure 10:
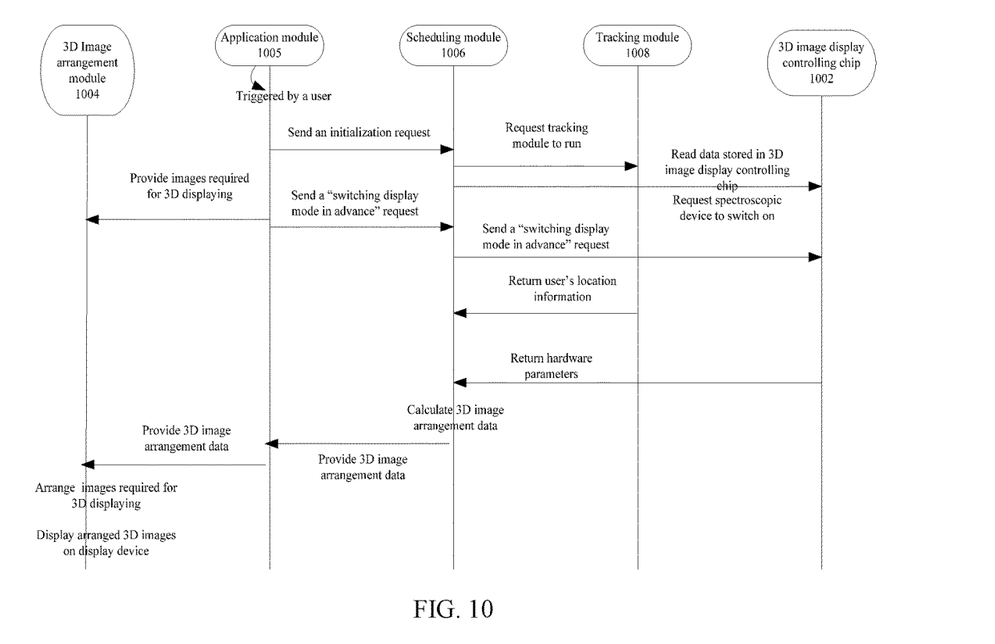
FIG. 10 illustrates another exemplary interaction sequence diagram in an exemplary autostereoscopic 3D image display device consistent with disclosed embodiments.

In another embodiment, as shown in FIG. 10, an application module 1005 may be able to determine in advance whether the current 3D (or 2D) display mode needs to be switched. FIG. 10 illustrates another exemplary interaction sequence diagram in an exemplary autostereoscopic 3D image display device consistent with disclosed embodiments. As shown in FIG. 10, the application module 1005 may send a "switching display mode in advance" request to a scheduling module 1006 in advance. After receiving the "switching display mode in advance" request, the scheduling module 1006 may send the "switching display mode in advance" request to a 3D image display controlling chip 1002, which may control the display driving circuit of the liquid crystal grating to switch the display device to the desired 2D (or 3D) display mode.

After a period of approximately 4 s, the display mode switching process (i.e. the switching time is approximately 4 s) may be completed and, meanwhile the display device may be ready to display a 2D (or 3D) content. Thus, on one hand, a time delay between the "switching display mode in advance" request and the content displayed on the display device may be eliminated; on the other hand, the content displayed on the display device may be consistent with and the display mode of the display device.

For example, a 3D display device which can play 2D and 3D videos is currently playing a 2D video. When the 3D display device is desired to play a 3D video, the 3D display device may switch to the 3D display mode. The scheduling module may send the "switching mode" request to the 3D image display controlling chip and the display device may start to switch the display mode. During the display mode switching process (approximately 4 s), the scheduling module may send the "waiting" request to the application module. When the application module is receiving the "waiting" request, the 3D display device may still play the 2D video. After the display device have been successfully switched to the 3D display mode, the scheduling mode may send the "switching complete" request to the application module, and then the 3D display device may begin to play 3D images, 3D videos and etc.

If the 3D display device has a playlist including both 2D videos and 3D videos, the 3D display device is currently playing a 2D video while going to play a 3D video next. When the application module detects the 2D video will end in approximately 4 s, the application module may send a "switching display mode in advance" request to the scheduling module. After receiving the "switching display mode in advance" request, the scheduling module may send the "switching display mode in advance" request to the 3D image display controlling chip. Then the 3D image display controlling chip may control the display driving circuit of the liquid crystal grating to switch the display mode of the display device. After approximately 4 s, the display device may have been switched to the 3D display mode and, meanwhile the 3D display device may start to play the 3D video.

Further, the present invention may provide the user a more intelligent experience when an interruption occurs in an operation platform. When the application module is running in the foreground, the scheduling module may support any request from the application module. When the application module is hidden, terminated and a window of the application module is blocked or minimized, i.e., the application module is preempted by other tasks, the scheduling module may detect such situations and then automatically switch the display device to the 2D display mode. Thus the user may continue to perform other tasks without any interruption.

When the application module appears again, continues running and the window of the application module is fully displayed, i.e., the other tasks stops, the scheduling module may detect such situations and then automatically switch the display device to the 3D display mode, providing a consistent 3D experience to the user.

For example, in a Windows operation system, when the window of the application module appears on the desktop, the scheduling module may switch the display device to the 3D display mode. When the window of the application module is detected to be minimized or blocked by other windows, the scheduling module may automatically switch the display device to the 2D display mode. When the application module window appears again or is no longer blocked by other windows, the scheduling module may automatically switch the display device to the 3D display mode.

On a mobile platform of a cell phone, when the application module is displayed at the front end, the scheduling module may automatically switch the display device to the 3D display mode. When the application module detects any incoming call, message or other high priority notification, the scheduling module may automatically switch the display device to the 2D display mode. After the user ends/ignores the call, replies the message/notification, or ignores the notification, the scheduling module may automatically switch the display device to the 3D display mode.

Those of skill would further appreciate that the various illustrative modules and algorithm steps disclosed in the embodiments may be implemented as electronic hardware, computer software, or combinations of both. To clearly illustrate this interchangeability of hardware and software, various illustrative modules and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm disclosed in the embodiments may be embodied directly in hardware, in a software module executed by a processor, or in a combination of the two. A software module may reside in RAM, flash memory, ROM, EPROM (erasable programmable read-only memory), EEPROM (electrically erasable programmable read-only memory), registers, hard disk, a removable disk, a CD-ROM, or any other form of storage medium known in the art.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An autostereoscopic three-dimensional (3D) display device, comprising:
   a tracking device configured to track a user in an autostereoscopic 3D viewing state;
   a display panel coupled with a spectroscopic device for 3D displaying;
   a display driving circuit for driving the spectroscopic device and controlling the display panel;
   a display controlling chip configured to store hardware parameters of the autostereoscopic 3D display device and to control the display driving circuit to switch on/off the spectroscopic device, wherein the hardware parameters of the autostereoscopic 3D display device includes a width of the autostereoscopic 3D display device, a distance between the autostereoscopic 3D display device and the display panel, and driving voltages of the autostereoscopic 3D display device;
   an application module configured to receive a 3D displaying request from an application program;
   a tracking module configured to obtain position information of the user by the tracking device;
   a scheduling module configured to read the hardware parameters of the autostereoscopic 3D display device from the display controlling chip and to calculate 3D image arrangement data; and
   a 3D image arrangement module configured to receive the 3D image arrangement data and to arrange an image required for 3D displaying,
   wherein the scheduling module causes the display controlling chip to switch on the spectroscopic device to enter a 3D display mode for displaying the arranged image on the display panel.

2. The autostereoscopic 3D display device according to claim 1, wherein the application module is further configured to:
   send an initialization request to the scheduling module;
   send the 3D displaying request to the scheduling module after sending the initialization request to the scheduling module;
   receive the 3D image arrangement data from the scheduling module;
   send the 3D image arrangement data to the 3D image arrangement module after receiving the 3D image arrangement data from the scheduling module; and
   send the image required for 3D displaying to the 3D image arrangement module after receiving the image arrangement data from the scheduling module.

3. The autostereoscopic 3D display device according to claim 1, wherein the tracking module is further configured to:
   control the tracking device to track the user;
   determine location information of the user's left eye and right eye based on tracking results of the tracking device; and
   send the location information of the user's left eye and right eye to the scheduling module.

4. The autostereoscopic 3D display device according to claim 1, wherein the scheduling module is further configured to:
   control the tracking module to run after receiving the initialization request from the application module;
   read the hardware parameters of the autostereoscopic 3D display device from the display controlling chip after receiving the initialization request from the application module;
   calculate the 3D image arrangement data based on the location information of the user's left eye and right eye from the tracking module and the hardware parameters of the autostereoscopic 3D display device from the display controlling chip;
   send the 3D image arrangement data to the application module through the data interface; and
   request the display controlling chip to control the display driving circuit to switch on the spectroscopic device for the display panel to enter a 3D display mode after receiving the 3D displaying request from the scheduling module.

5. The autostereoscopic 3D display device according to claim 1, wherein the 3D image arrangement module is further configured to:
   arrange the images required for 3D displaying after receiving the images required for 3D displaying from the application module and the 3D image arrangement data from the scheduling module.

6. The autostereoscopic 3D display device according to claim 1, wherein the display panel is further configured to:
   display 3D images after entering the 3D display mode and receiving the images arranged by the 3D image arrangement module.

7. The autostereoscopic 3D display device according to claim 1, wherein:
   the 3D image arrangement data is not transferred through the data interface between the 3D image arrangement module and the application module.

8. The autostereoscopic 3D display device according to claim 1, wherein:
   the 3D image arrangement data is transferred through the data interface between the 3D image arrangement module and the application module.

9. The autostereoscopic 3D display device according to claim 1, wherein the scheduling module is further configured to:
   power on the display controlling chip when reading the hardware parameters of the autostereoscopic 3D display device from the display controlling chip;
   save the hardware parameters of the autostereoscopic 3D display device; and
   power off the display controlling chip after finishing reading the hardware parameters of the autostereoscopic 3D display device from the display controlling chip.

10. The autostereoscopic 3D display device according to claim 1, wherein the scheduling module is further configured to:
    power off the display controlling chip after requesting the display controlling chip to control the display driving circuit to switch on the spectroscopic device.

11. The autostereoscopic 3D display device according to claim 1, wherein the application module is further configured to:
    send an uninstalling request to the scheduling module through the data interface after being trigged by the user.

12. The autostereoscopic 3D display device according to claim 11, wherein the scheduling module is further configured to:
    request the tracking module to stop the tracking device; and
    request the display controlling chip to control the display driving circuit to switch off the spectroscopic device.

13. A method for an autostereoscopic three-dimensional (3D) display device containing a tracking device, a display panel coupled with a spectroscopic device, a display driving circuit, and a display controlling chip, the method comprising:
- receiving a request from an application program for a 3D displaying mode;
- based on the request, tracking position information of a user by the tracking device;
- obtaining hardware parameters of the autostereoscopic 3D display device from the display controlling chip, wherein the hardware parameters of the autostereoscopic 3D display device includes a width of the autostereoscopic 3D display device, a distance between the autostereoscopic 3D display device and the display panel, and driving voltages of the autostereoscopic 3D display device;
- switching on the spectroscopic device through the display driving circuit for the display panel to enter the 3D display mode;
- determining 3D image arrangement data;
- arranging an image required for 3D displaying;
- displaying the arranged image on the display panel.

14. The autostereoscopic 3D display method according to claim 13, further including:
- based on tracking information of the user, calculating location information of the user's left eye and right eye;
- based on the hardware parameters of the autostereoscopic 3D display device and the location information of the user's left eye and right eye, calculating the 3D image arrangement data; and
- based on the 3D image arrangement data, arranging the image required for 3D displaying.

15. The autostereoscopic 3D display method according to claim 13, further including:
- determining that the application program exits; and
- switching off the spectroscopic device for the display panel to enter a 2D display mode.

16. The autostereoscopic 3D display method according to claim 13, further including:
- switching on the spectroscopic device to start a display mode switching process from the 2D display mode to the 3D display mode;
- keeping the 2D display mode until finishing the display mode switching process; and
- entering the 3D display mode.

17. The autostereoscopic 3D display method according to claim 13, further including:
- switching off the spectroscopic device to start the display mode switching process from the 3D display mode to the 2D display mode;
- keeping the 3D display mode until finishing the display mode switching process; and
- entering the 2D display mode.

18. The autostereoscopic 3D display method according to claim 13, further including:
- detecting an intent to switch the 2D display mode to the 3D display mode;
- determining a time period of the display mode switching process from the 2D display mode to the 3D display mode; and
- switching on the spectroscopic device in advance of the display mode switching process by the time period.

19. The autostereoscopic 3D display method according to claim 13, further including:
- detecting an intent to switch the 3D display mode to the 2D display mode;
- determining a time period of the display mode switching process from the 3D display mode to the 2D display mode; and
- switching off the spectroscopic device in advance of the display mode switching process by the time period.

20. The autostereoscopic 3D display method according to claim 13, further including:
- switching the 3D display mode to the 2D display mode when an interruption occurs in an operation system of the display device; and
- switching the 2D display mode to the 3D display mode when the interruption in the operation system terminates.

* * * * *